United States Patent
Zheng et al.

(10) Patent No.: US 10,097,277 B2
(45) Date of Patent: Oct. 9, 2018

(54) OPTICAL MODULATOR BIAS LOCKING

(71) Applicant: Futurewei Technologies, Inc., Plano, TX (US)

(72) Inventors: Xueyan Zheng, Dublin, CA (US); Jianying Zhou, Acton, MA (US); Xiao Shen, San Bruno, CA (US); Chunlei Liao, San Jose, CA (US); Hongbing Lei, San Jose, CA (US); Hongmin Chen, Davis, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/414,349

(22) Filed: Jan. 24, 2017

(65) Prior Publication Data
US 2017/0244492 A1 Aug. 24, 2017

Related U.S. Application Data

(60) Provisional application No. 62/297,703, filed on Feb. 19, 2016.

(51) Int. Cl.
| | | |
|---|---|---|
| *H04B 10/564* | (2013.01) | |
| *H04B 10/516* | (2013.01) | |
| *H04B 10/079* | (2013.01) | |
| *H04L 7/00* | (2006.01) | |

(52) U.S. Cl.
CPC ..... *H04B 10/564* (2013.01); *H04B 10/07955* (2013.01); *H04B 10/5161* (2013.01); *H04L 7/0075* (2013.01)

(58) Field of Classification Search
CPC combination set(s) only.
See application file for complete search history.

(56) References Cited

U.S. PATENT DOCUMENTS

| | | | |
|---|---|---|---|
| 6,046,838 | A | 4/2000 | Kou et al. |
| 7,075,695 | B2 | 7/2006 | Gronbach |
| 7,715,732 | B2 | 5/2010 | Koh et al. |
| 7,729,621 | B2 | 6/2010 | Nahapetian et al. |
| 7,916,377 | B2 | 3/2011 | Witzens et al. |
| 8,175,465 | B2 | 5/2012 | Wang et al. |
| 9,158,137 | B1 | 10/2015 | Abbas |

(Continued)

FOREIGN PATENT DOCUMENTS

| | | |
|---|---|---|
| CN | 102722204 A | 10/2012 |
| CN | 103048810 A | 4/2013 |
| EP | 0723320 B1 | 6/2004 |

OTHER PUBLICATIONS

Machine Translation and Abstract of Chinese Publication No. CN102722204, Oct. 10, 2012, 7 pages.

(Continued)

*Primary Examiner* — David Payne
*Assistant Examiner* — Omar S Ismail
(74) *Attorney, Agent, or Firm* — Conley Rose, P.C.

(57) ABSTRACT

An apparatus comprises: a first input tap; a first optical modulator coupled to the first input tap; a first output tap coupled to the first optical modulator so that the first optical modulator is positioned between the first input tap and the first output tap; and a controller indirectly coupled to the first input tap and the first output tap.

19 Claims, 10 Drawing Sheets

(56) References Cited

U.S. PATENT DOCUMENTS

| | | | | |
|---|---|---|---|---|
| 2005/0058460 A1* | 3/2005 | Wang | ............... | H04B 10/503 |
| | | | | 398/195 |
| 2007/0092177 A1* | 4/2007 | Nilsson | ............. | B82Y 20/00 |
| | | | | 385/14 |
| 2008/0094123 A1* | 4/2008 | Koh | .................. | G02F 1/0123 |
| | | | | 327/513 |
| 2010/0054757 A1* | 3/2010 | Smith | ............... | G02F 1/0123 |
| | | | | 398/198 |
| 2010/0220952 A1* | 9/2010 | Smith | ............... | H01S 5/0683 |
| | | | | 385/14 |
| 2011/0013907 A1* | 1/2011 | Sugihara | ........... | G02F 1/0123 |
| | | | | 398/38 |
| 2011/0249936 A1* | 10/2011 | Welch | ............... | B82Y 20/00 |
| | | | | 385/31 |
| 2015/0207569 A1* | 7/2015 | Bhandare | ............ | H04J 14/06 |
| | | | | 398/184 |

OTHER PUBLICATIONS

Machine Translation and Abstract of Chinese Publication No. CN103048810, Apr. 17, 2013, 12 pages.

Foreign Communication From a Counterpart Application, PCT Application No. PCT/CN2017/073065, English Translation of International Search Report dated May 12, 2017, 5 pages.

Wang, et al., "A Versatile Bias Control Technique for Any-Point Locking in Lithium Niobate Mach-Zehnder Modulators," Journal of Lightwave Technology, vol. 28, No. 11, Jun. 1, 2010, pp. 1703-1706.

\* cited by examiner

OPTICAL MODULATOR BIAS LOCKING

CROSS-REFERENCE TO RELATED APPLICATIONS

This application claims priority to U.S. provisional patent application No. 62/297,703 filed on Feb. 19, 2016 by Xueyan Zheng, et al., and titled "Mach-Zehnder Modulator (MZM) Bias Locking," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data centers house computer systems and associated components for telecommunications networks and storage networks. For telecommunications networks, data centers operate carriers' telecommunications networks, provide applications directly to carrier customers, and host applications for third parties to provide applications to their customers. For storage networks, data centers provide monitoring services, security services, and backup and associated recovery services when customers lose their primary data.

Data centers are identified by different tiers. A lowest tier is essentially a server room. A highest tier hosts mission-critical systems including redundant subsystems and compartmentalizes security zones controlled by biometric access controls. Different standards organizations define varying tiers in between the lowest tier and the highest tier in different manners.

Organizations using data centers demand that the data centers provide security, reliable availability, fast processing, and fast communication. However, as those organizations innovate and experience rapid IT growth, some data centers are becoming obsolete and not meeting the organizations' demands. It is therefore desirable to develop new data center components to help data centers meet those demands.

SUMMARY

An integrated optical transmitter with an integrated laser source, optical components, an RF driver, and an electrical control circuit needs a suitable MZM bias locking scheme. According to various embodiments of the present disclosure, embodiments for optical modulator bias locking are disclosed. The embodiments introduce dither signals at LDs instead of at optical modulators. Input taps tap the dither signals at inputs of the optical modulators and output taps tap the dither signals at outputs of the optical modulators. The optical modulators are MZMs or other suitable modulators. Multiple dither signals may share a single MPD and a single ADC. The embodiments disclosed herein provide many advantages. Specifically, input optical power variations due to the dither signals do not affect bias points of the optical modulators because ratios of dither signals from the input taps to the output taps remain the same. The embodiments provide for improved locking accuracy and a relaxed ADC resolution. Amplitudes of the dither signals' first-order harmonics are relatively high, thus improving SNRs and reducing amplification circuit complexity. Compared to DC signals, the dither signals' first-order harmonics are less susceptible to locking accuracy degradation due to MPD dark currents because the dark currents may be filtered out with low-pass filters centered at about 0 kHz. At outputs of the optical modulators, the embodiments provide for 2×1 couplers, which have a better process tolerance and a lower optical loss compared with 2×2 couplers. Reducing a number of MPDs and ADCs reduces hardware footprints. Finally, LDs may work in an automatic power control mode by locking to maximum values of first-order harmonics detected at the input taps.

In one embodiment, the disclosure includes an apparatus comprising: a first input tap; a first optical modulator coupled to the first input tap; a first output tap coupled to the first optical modulator so that the first optical modulator is positioned between the first input tap and the first output tap; and a controller indirectly coupled to the first input tap and the first output tap. In some embodiments, the apparatus further comprises: an LD coupled to the first input tap and the controller; the apparatus further comprises: a first MPD coupled to the first input tap; a first amplifier coupled to the first MPD; and a first ADC coupled to the first amplifier and the controller so that the first MPD, the first amplifier, and the first ADC are positioned between the first input tap and the controller; the apparatus further comprises: a second MPD coupled to the first output tap; a second amplifier coupled to the second MPD; and a second ADC coupled to the second amplifier and the controller so that the second MPD, the second amplifier, and the second ADC are positioned between the first output tap and the controller; the first optical modulator is an MZM comprising: a 1×2 coupler coupled to the first input tap; a first phase section optically coupled to the 1×2 coupler; a second phase section optically coupled to the 1×2 coupler and electrically coupled to the controller; and a 2×1 coupler coupled to the first phase section, the second phase section, and the first output tap; the apparatus further comprises: a switch coupled to the controller; a first LD coupled to the switch and the first input tap; a second LD coupled to the switch; a second input tap coupled to the second LD; a second optical modulator coupled to the second input tap; and a second output tap coupled to the second optical modulator so that the second optical modulator is positioned between the second input tap and the second output tap, wherein the controller is indirectly coupled to the second input tap and the second output tap; the apparatus further comprises: a first optical combiner coupled to the first input tap and the second input tap; a first MPD coupled to the first optical combiner; a first amplifier coupled to the first MPD; and a first ADC coupled to the first amplifier and the controller so that the first optical combiner, the first MPD, the first amplifier, and the first ADC are positioned between the first input tap and the second input tap on one hand and the controller on another hand; the apparatus further comprises: a second optical combiner coupled to the first output tap and the second output tap; a second MPD coupled to the second optical combiner; a second amplifier coupled to the second MPD; and a second ADC coupled to the second amplifier and the controller so that the second optical combiner, the second MPD, the second amplifier, and the second ADC are positioned between the first output tap and the second output tap on one hand and the controller on another hand; the apparatus further comprises: a first MPD coupled to the first input tap; a second MPD coupled to the second input tap; a first electrical combiner coupled to the first MPD and the second MPD; a first amplifier coupled to the first electrical combiner; and a first ADC coupled to the first amplifier and the controller so that the first electrical combiner, the first amplifier, and the first ADC are positioned between the first input tap and the second input tap on one hand and the controller on another hand; the apparatus further comprises: a third MPD coupled to the first output tap; a fourth MPD coupled to the second output tap; a second electrical combiner coupled to the third MPD and the fourth MPD; a second amplifier coupled to the second electrical combiner; and a second ADC coupled to the second amplifier and the controller so that the second electrical combiner, the second amplifier, and the second ADC are positioned between the first output tap and the second output tap on one side and the controller on another side.

In another embodiment, the disclosure includes an apparatus comprising: a controller configured to generate an electrical bias signal and an electrical dither signal; an LD configured to: convert the electrical bias signal into an optical bias signal; convert the electrical dither signal into an optical dither signal; and combine the optical bias signal and the optical dither signal to generate an input optical signal; and an optical modulator configured to generate an output modulator signal based on the input optical signal; wherein the controller is further configured to: generate a locking signal; pass the locking signal to the optical modulator to adjust a phase difference of the optical modulator; and adjust the locking signal based on the optical dither signal. In some embodiments, the apparatus further comprises: an input tap coupled to the LD and configured to: tap off an input tap signal from the input optical signal; and pass an input modulator signal to the optical modulator; a first MPD configured to convert the input tap signal to a first analog signal; a first amplifier configured to amplify the first analog signal to create a first amplified analog signal; and an ADC configured to convert the first amplified analog signal to a digital input tap signal; the apparatus further comprises: an output tap configured to: tap off an output tap signal from the output modulator signal; and pass an output optical signal; a second MPD configured to convert the output tap signal to a second analog signal; a second amplifier configured to amplify the second analog signal to create a second amplified analog signal; and an ADC configured to convert the second amplified analog signal to a digital output tap signal; the controller is further configured to: receive the digital input tap signal; filter out a first dither signal from the digital input tap signal; receive the digital output tap signal; filter out a second dither signal from the digital output tap signal; determine a ratio of the second dither signal to the first dither signal; and further adjust the locking signal based on the ratio; the controller is further configured to further adjust the locking signal until the phase difference reaches a working point.

In yet another embodiment, the disclosure includes a method comprising: generating an electrical bias signal and an electrical dither signal; converting, by an LD the electrical bias signal into an optical bias signal; converting, by the LD, the electrical dither signal into an optical dither signal; combining, by the LD, the optical bias signal and the optical dither signal to generate an input optical signal; generating an output modulator signal based on the input optical signal; generating a locking signal; passing the locking signal to adjust a phase difference of an optical modulator; and adjusting the locking signal based on the optical dither signal. In some embodiments, the method further comprises: tapping off an input tap signal from the input optical signal; passing an input modulator signal; converting the input tap signal to a first analog signal; amplifying the first analog signal to create a first amplified analog signal; and converting the first amplified analog signal to a digital input tap signal; the method further comprises: tapping off an output tap signal from the output modulator signal; passing an output optical signal; converting the output tap signal to a second analog signal; amplifying the second analog signal to create a second amplified analog signal; and converting the second amplified analog signal to a digital output tap signal; the method further comprises: receiving the digital input tap signal; filtering out a first dither signal from the digital input tap signal; receiving the digital output tap signal; filtering out a second dither signal from the digital output; the method further comprises: further adjusting the locking signal until the phase difference reaches a working point.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
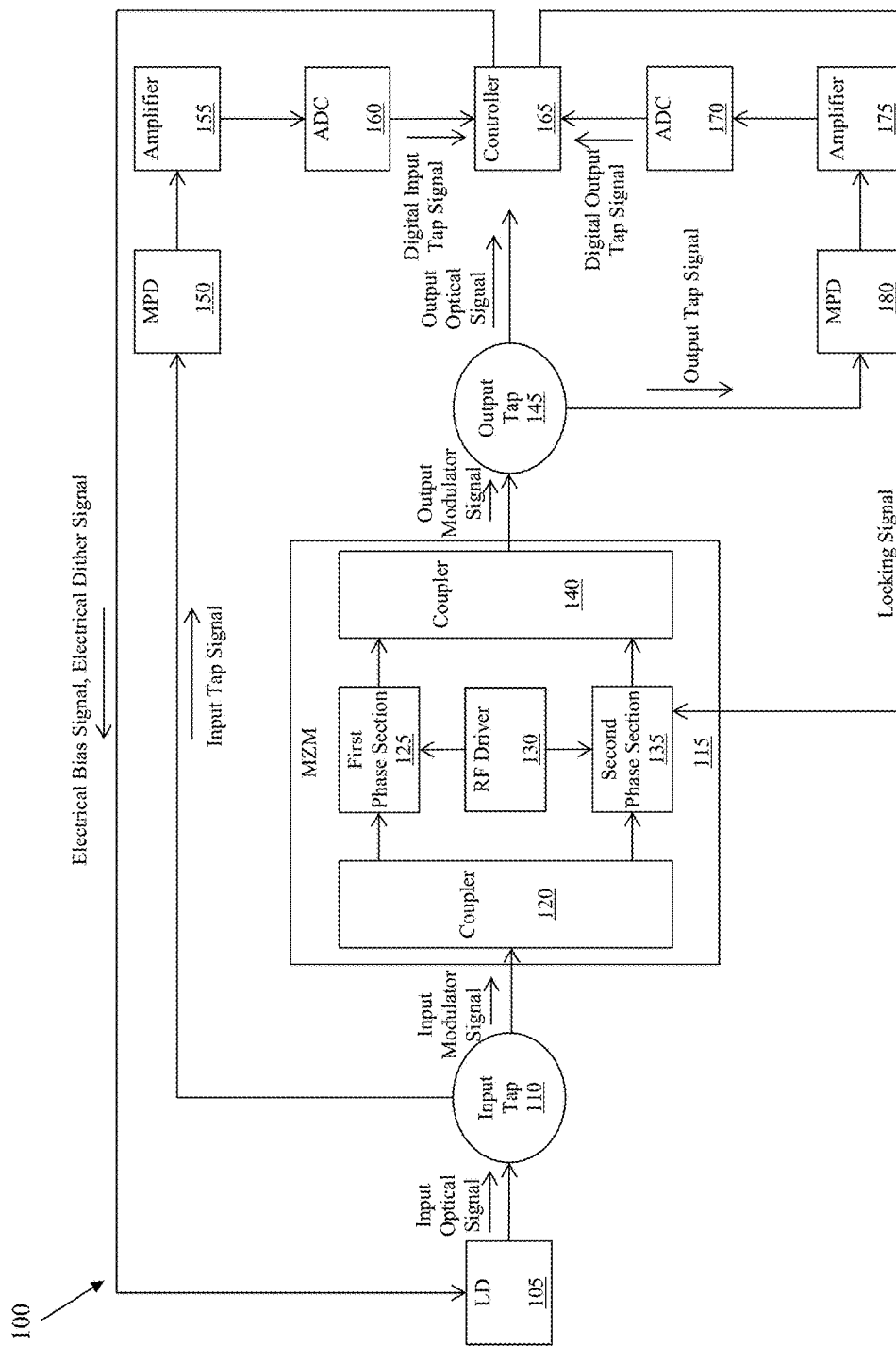
FIG. 1 is a schematic diagram of a transceiver according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following initialisms and abbreviations apply:
ADC: analog-to-digital converter
ASIC: application-specific integrated circuit
CPU: central processing unit
DC: direct current
DSP: digital signal processor EO: electrical-to-optical
ER: extinction ratio
FPGA: field-programmable gate array
Gb/s: gigabits per second
Hz: hertz
InP: indium phosphide
ISI: inter-symbol interference
IT: information technology
kHz: kilohertz
LD: laser diode
$LiNbO_3$: lithium niobate
MPD: monitoring photodiode
MZM: Mach-Zehnder modulator
OE: optical-to-electrical
RAM: random-access memory
RF: radio frequency
ROM: read-only memory
RX: receiver unit
Si: silicon
SNR: signal-to-noise ratio
SRAM: static RAM
TCAM: ternary-content addressable memory
TX: transmitter unit
°: degrees
%: percent.

MZMs are widely used in optical communications networks and typically comprise $LiNbO_3$-, InP-, or Si-based approaches. MZMs modulate optical phase differences, or phase offsets, between phases of two waveguides. Outputs from those two waveguides constructively interfere or destructively interfere to achieve amplitude modulation. The phase differences are precisely controlled in order to achieve good optical performance such as a high ER and a low time jitter, phase jitter, and ISI.

However, the phases of the waveguides, and hence the phase differences, vary with environmental changes, component aging, and other factors. As a result, many MZM-based systems comprise bias control loops that compensate for those variations. Such bias control loops provide DC compensation signals that help the MZMs lock to quadrature points, or null points, on their transfer curves.

There are at least three different approaches to quadrature point locking. In a first approach, an MZM locks onto a maximum value of a dither signal's first-order harmonic. However, the first approach suffers from poor locking accuracy. In a second approach, an MZM locks onto a minimum value of a dither signal's second-order harmonic. However, the second approach suffers from a low SNR because the second-order harmonic is relatively weak. In order to address that shortcoming and provide good performance, the MZM is paired with a linear amplifier or a narrow-band filter, both of which comprise complicated circuits that are inconsistent with high-density, small-footprint optical transceiver boards. In a third approach, an MZM locks onto a low-frequency dither signal that is added to an RF signal. However, the third approach adds complexity to the design of a driver in an integrated optoelectronics chip. In addition, the third approach requires a broadband bias tee to combine the dither signal and the RF signal, and the bias tee occupies additional circuit space. All three approaches introduce the dither signal to waveguides of the MZMs.

There is therefore a need to solve the shortcomings of those three approaches and other approaches. Furthermore, as demand for capacity increases and channel densities of optical transmitters become higher, there is also a need to reduce cost, power consumption, and component footprints. An integrated optical transmitter with an integrated laser source, optical components, an RF driver, and an electrical control circuit meets the above criteria. However, such an integrated optical transmitter needs a suitable MZM bias locking scheme.

Disclosed herein are embodiments for optical modulator bias locking. The embodiments introduce dither signals at LDs instead of at optical modulators. Input taps tap the dither signals at inputs of the optical modulators and output taps tap the dither signals at outputs of the optical modulators. The optical modulators are MZMs or other suitable modulators. Multiple dither signals may share a single MPD and a single ADC. The embodiments provide many advantages. Specifically, input optical power variations due to the dither signals do not affect bias points of the optical modulators because ratios of dither signals from the input taps to the output taps remain the same. The embodiments provide for improved locking accuracy and a relaxed ADC resolution. Amplitudes of the dither signals' first-order harmonics are relatively high, thus improving SNRs and reducing amplification circuit complexity. Compared to DC signals, the dither signals' first-order harmonics are less susceptible to locking accuracy degradation due to MPD dark currents because the dark currents may be filtered out with low-pass filters centered at about 0 kHz. At outputs of the optical modulators, the embodiments provide for 2×1 couplers, which have a better process tolerance and a lower optical loss compared with 2×2 couplers. Reducing a number of MPDs and ADCs reduces hardware footprints. Finally, LDs may work in an automatic power control mode by locking to maximum values of first-order harmonics detected at the input taps.

FIG. 1 is a schematic diagram of a transceiver 100 according to an embodiment of the disclosure. The transceiver 100 comprises an LD 105, an input tap 110, an MZM 115, an output tap 145, an MPD 150, an amplifier 155, an ADC 160, a controller 165, an ADC 170, an amplifier 175, and an MPD 180. The MZM 115 is an optical modulator and comprises a coupler 120; a first phase section 125, which may include high-speed phase sections for converting high-speed RF signals to optical signals and may include low-speed phase tuning sections; an RF driver 130; a second phase section 135, which may also include high-speed phase sections for converting high-speed RF signals to optical signals and may include low-speed phase tuning sections; and a coupler 140. The coupler 120 is a 1×2 coupler, and the coupler 140 is a 2×1 coupler. Though the RF driver 130 is shown as a component of the MZM 115, the RF driver 130 may be external to the MZM 115. FIG. 1 shows transmitter components of the transceiver 100, but the transceiver 100 also comprises receiver components that are not shown.

The controller 165 generates an electrical bias signal and an electrical dither signal and passes them to the LD 105. In response, the LD 105 converts the electrical bias signal into an optical bias signal, converts the electrical dither signal into an optical dither signal, combines the optical bias signal and the optical dither signal to generate an input optical signal, and provides the input optical signal to the MZM 115 in a continuous manner. A first-order harmonic of the dither signal has a relatively low frequency in the kHz to MHz range and outside of the high-speed signal frequency range. For instance, the first-order harmonic of the dither signal has a frequency of about 1 kHz. The optical dither signal has a modulation depth of 1%-10% or another suitable range. The modulation depth refers to an amplitude of the dither signal divided by an amplitude of the input optical signal. The dither signal has little or no impact on a power variation of an output optical signal.

The input tap 110 taps off an input tap signal from the input optical signal, passes the input tap signal to the MPD 150, and passes a remaining input modulator signal to the MZM 115. The input tap 110 has, for instance, a 1%-5% tap ratio, meaning that the input tap signal has an optical power of about 1%-5% of the optical power of the combined optical signal and the input modulator signal has an optical power of about 95%-99% of the power of the combined optical signal. The input tap 110 introduces a minimal insertion loss. The tap ratio may be selected based on the application of the transceiver 100, and the input tap 110 may be selected to have an acceptable insertion loss for that application.

The coupler 120 evenly splits the input modulator signal into a first portion and a second portion. The RF driver 130 provides RF data signals at a relatively high frequency of at least about 1 Gbit/s to the first phase section 125 and the second phase section 135. The RF data signals modulate the first portion to generate a modulated first portion and modulate the second portion to generate a modulated second portion with a phase that is different from the phase of the modulated first portion. The first phase section 125 may not have DC phase shifter. The second phase section 135 may include a DC phase shifter that receives a locking signal from the controller 165 to induce a phase shift in the modulated second portion. The phase shift introduces a phase difference between the modulated first portion and the modulated second portion to bias the MZM at desired points. The coupler 140 couples the modulated first portion and the modulated second portion, which constructively interfere or destructively interfere based on the phase difference, to create an output modulator signal. The interference affects an amplitude of the output modulator signal, so the phase difference serves as a modulator of the amplitude of the output modulator signal.

The output tap 145 taps off an output tap signal from the output modulator signal, passes the output tap signal to the MPD 180, and outputs a remaining output signal for further processing or transmission. The output tap 145 has a 1%-5% tap ratio, meaning that the output tap signal has an optical power of about 1%-5% of the optical power of the output modulator signal and the output signal has an optical power of about 95%-99% of the power of the output modulator signal. The output tap 145 introduces a minimal insertion loss. The tap ratio may be selected based on the application of the transceiver 100, and the input tap 110 may be selected to have an acceptable insertion loss for that application.

The MPD 150 converts the input tap signal, which is an optical signal, to an analog electrical signal. The amplifier 155 amplifies the analog electrical signal to create an amplified analog signal, and the ADC 160 converts the amplified analog signal to a digital input tap signal. The MPD 180 converts the output tap signal, which is an optical signal, to an analog electrical signal. The amplifier 175 amplifies the analog electrical signal to create an amplified analog signal, and the ADC 170 converts the amplified analog signal to a digital output tap signal.

The controller 165 receives both the digital input tap signal and the digital output tap signal. The controller 165 comprises a low-pass filter centered at a frequency of the dither signal, which may be about 1 kHz. The low-pass filter filters out the dither signal from both the digital input tap signal and the digital output tap signal. The controller 165 then determines a working point of the MZM 115 based on a ratio of the dither signal from the digital input tap signal and the dither signal from the digital output tap signal as described below with respect to FIG. 2.

Figure 2:
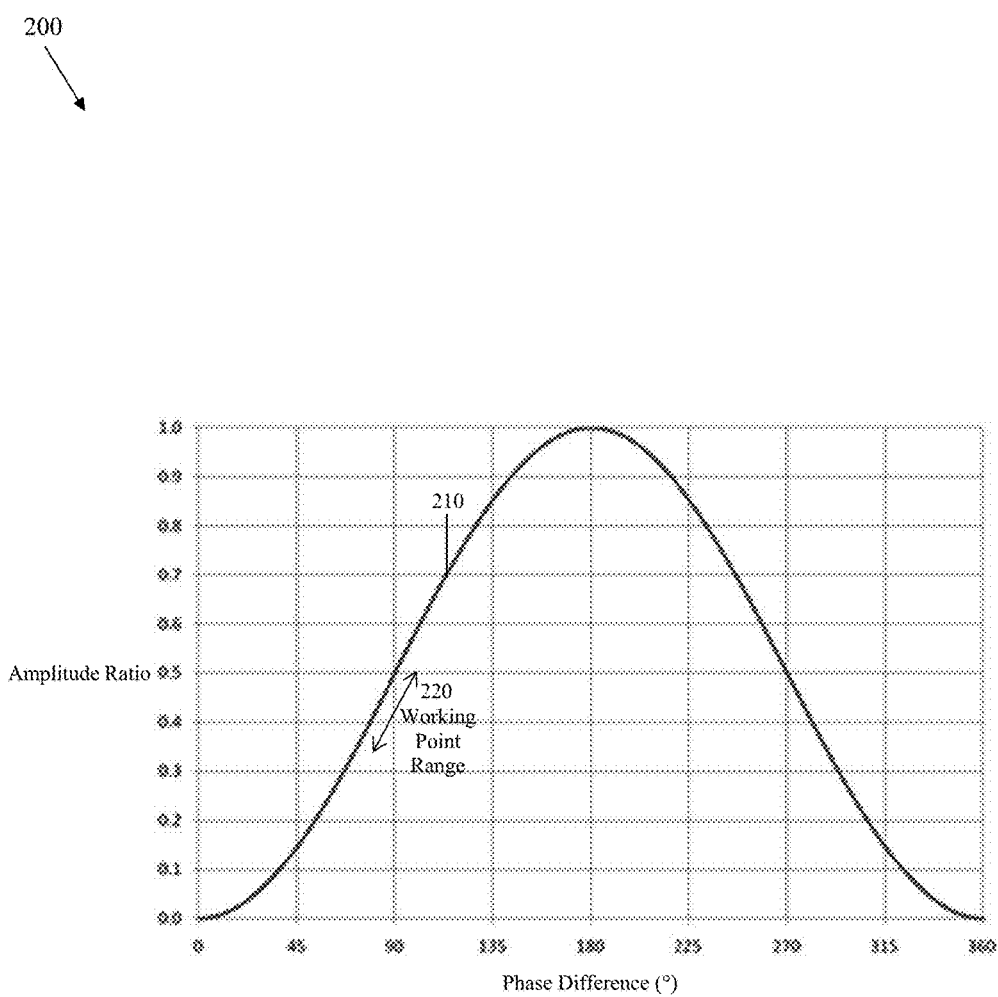
FIG. 2 is a graph demonstrating the working point of the MZM in FIG. 1.

FIG. 2 is a graph 200 demonstrating the working point of the MZM 115 in FIG. 1. The x-axis represents a phase difference between the first phase section 125 and the second phase section 135 in the MZM 115 in degrees, and the y-axis represents an amplitude ratio. The amplitude ratio is a ratio of an amplitude of the dither signal from the digital output tap signal to an amplitude of the dither signal from the digital input tap signal. The graph 200 comprises a curve 210 for the transceiver 100 that is obtained through experimentation before operation of the transceiver 100.

The curve 210 comprises a working point range 220 indicating a phase difference range of about 85°-95° at which the MZM 115 should operate. As can be seen, the curve 210 is linear or substantially linear near the working point range 220, indicating that the amplitude of the dither signal is mostly or only a function of optical power in the working point range 220. Ideally, the MZM 115 operates at a phase difference of about 90°, which is the working point. The MZM 115 may also operate at other suitable phase differences. The working point may be pre-set by changing the amplitude ratio at which the MZM 115 locks.

Returning to FIG. 1, the controller 165 calculates the amplitude ratio. If the amplitude ratio is below w, an amount corresponding to a phase difference of about 90°, then the controller 165 increases an amplitude of the locking signal in order to increase the phase difference of the MZM 115. Contrarily, if the amplitude ratio is above w, then the controller 165 decreases the amplitude of the locking signal in order to decrease the phase difference of the MZM 115. The controller 165 passes the locking signal to the second phase section 135. In response, the second phase section 135 alters its phase, which increases or decreases the phase difference of the MZM 115.

The controller 165 continues adjusting the locking signal until the MZM 115 reaches the working point of about 90°. The controller 165 may do so within a margin of error, for instance 1%, meaning that the controller 165 continues adjusting the locking signal until the MZM 115 reaches a phase difference of between about 89.1°-90.9°. The controller 165 may further adjust the locking signal in response to a command, an event such as a power on, environmental changes, or a schedule.

In an automatic power control mode, the controller 165 adjusts the bias signal in order to maintain a power of the output signal and therefore compensate for insertion loss variation over a lifetime of the transceiver 100. Instead of the low-frequency dither signal described above, the controller 165 may generate and pass a DC signal. In that case, the controller 165 comprises a band-pass filter centered at about 0 kHz that filters out the DC signal from both the digital input tap signal and the digital output tap signal. The controller 165 then generates and passes the locking signal as described above.

Figure 3:
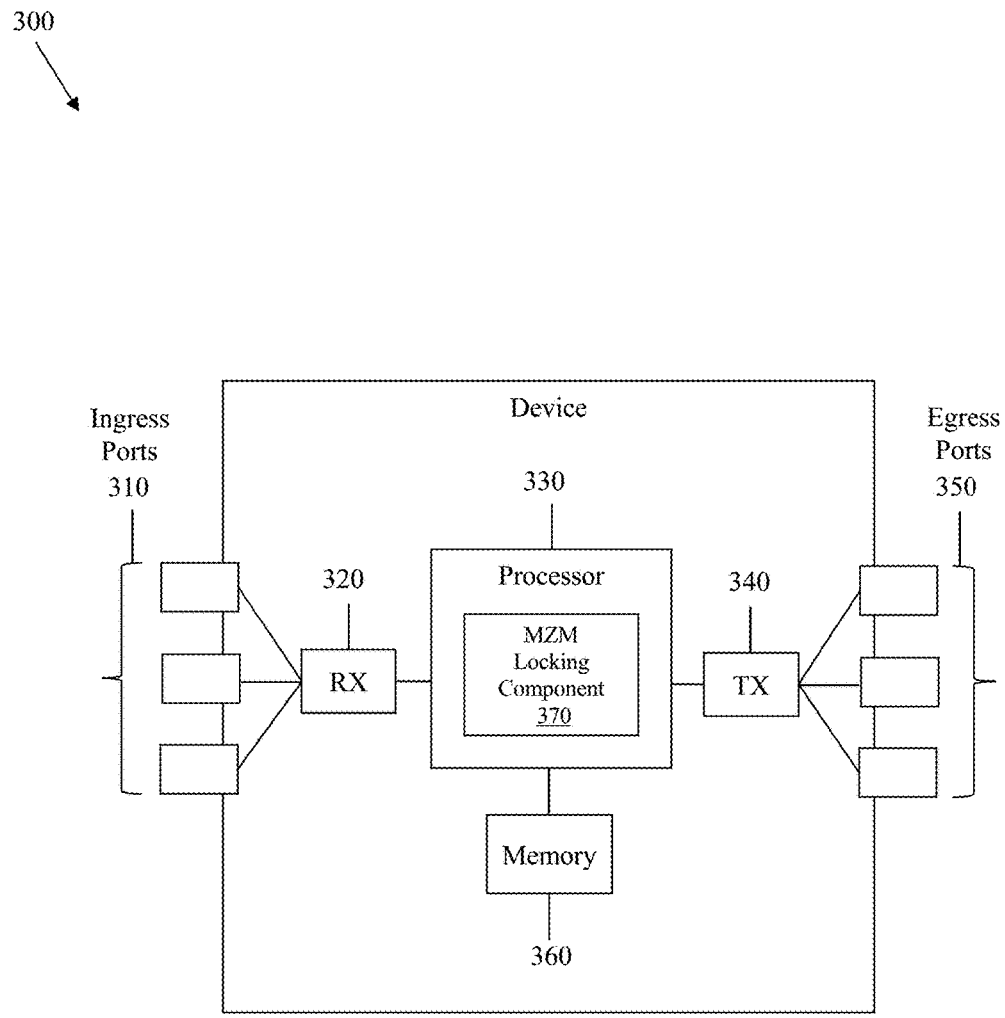
FIG. 3 is a schematic diagram of a device according to an embodiment of the disclosure.

FIG. 3 is a schematic diagram of a device 300 according to an embodiment of the disclosure. The device 300 may implement the disclosed embodiments, for instance the transceiver 100. The device 300 comprises ingress ports 310 and a RX 320 for receiving data; a processor, logic unit, or CPU 330 to process the data; a TX 340 and egress ports 350 for transmitting the data; and a memory 360 for storing the data. The device 300 may also comprise OE components and EO components coupled to the ingress ports 310, the RX 320, the TX 340, and the egress ports 350 for ingress or egress of optical or electrical signals.

The processor 330 is any suitable combination of hardware, middleware, firmware, and software. The processor 330 comprises any combination of one or more CPU chips, cores, FPGAs, ASICs, or DSPs. The processor 330 communicates with the ingress ports 310, RX 320, TX 340, egress ports 350, and memory 360. The processor 330 comprises an MZM locking component 370, which implements the disclosed embodiments. The inclusion of the MZM locking component 370 therefore provides a substantial improvement to the functionality of the device 300 and effects a transformation of the device 300 to a different state. Alternatively, the memory 360 stores the MZM locking component 370 as instructions, and the processor 330 executes those instructions. Further in the alternative, the device 300 comprises other means to implement the embodiments.

The memory 360 comprises one or more disks, tape drives, and solid-state drives. The device 300 may use the memory 360 as an over-flow data storage device to store programs when the device 300 selects those programs for execution and to store instructions and data that the device 300 reads during execution of those programs. The memory 360 may be volatile or non-volatile and may be any combination of ROM, RAM, TCAM, or SRAM.

Figure 4:
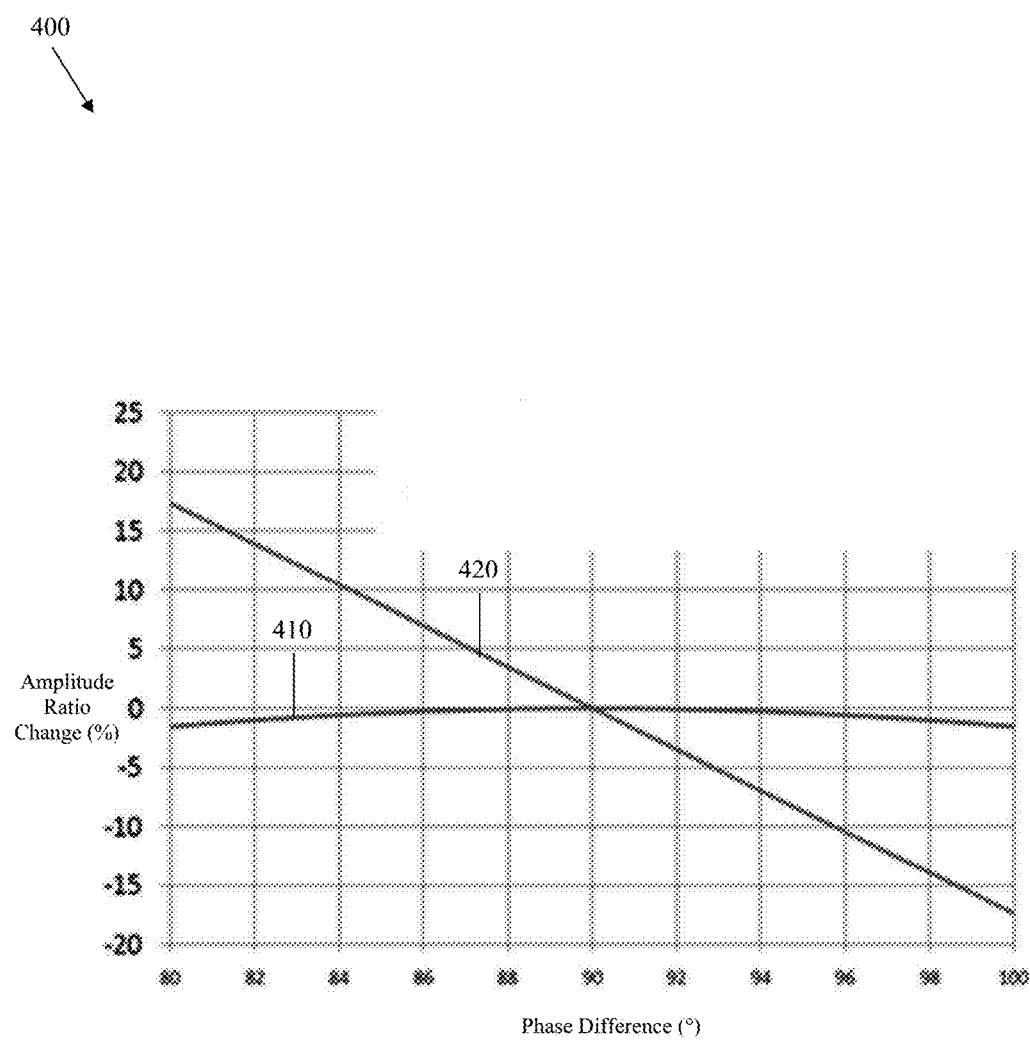
FIG. 4 is a graph of dither signal amplitude change sensitivity.

FIG. 4 is a graph 400 of dither signal amplitude change sensitivity. The x-axis represents an MZM phase difference in degrees, and the y-axis represents an amplitude change of a dither signal's first-order harmonic in percentage. The graph 400 comprises a first curve 410 representing a dither signal amplitude ratio change for a transceiver that introduces a dither signal at an MZM phase section and comprises a second curve 420 representing a dither signal amplitude ratio change for a transceiver such as the transceiver 100 that introduces a dither signal at an LD.

For the first curve 410, an amplitude ratio change of about 1.5% indicates an increase in the phase difference from about 80° to about 90°. For the second curve 420, an amplitude ratio change of about −17% indicates an increase in the phase difference from about 80° to about 90°. Thus, for the second curve 420, a much larger amplitude ratio change is needed to indicate the same phase difference. In other words, compared to introducing the dither signal at the MZM, introducing the dither signal at the LD provides greater sensitivity to the amplitude ratio change, which provides greater locking accuracy because it is easier to adjust the dither signal amplitude in order to adjust the phase difference.

Figure 5:
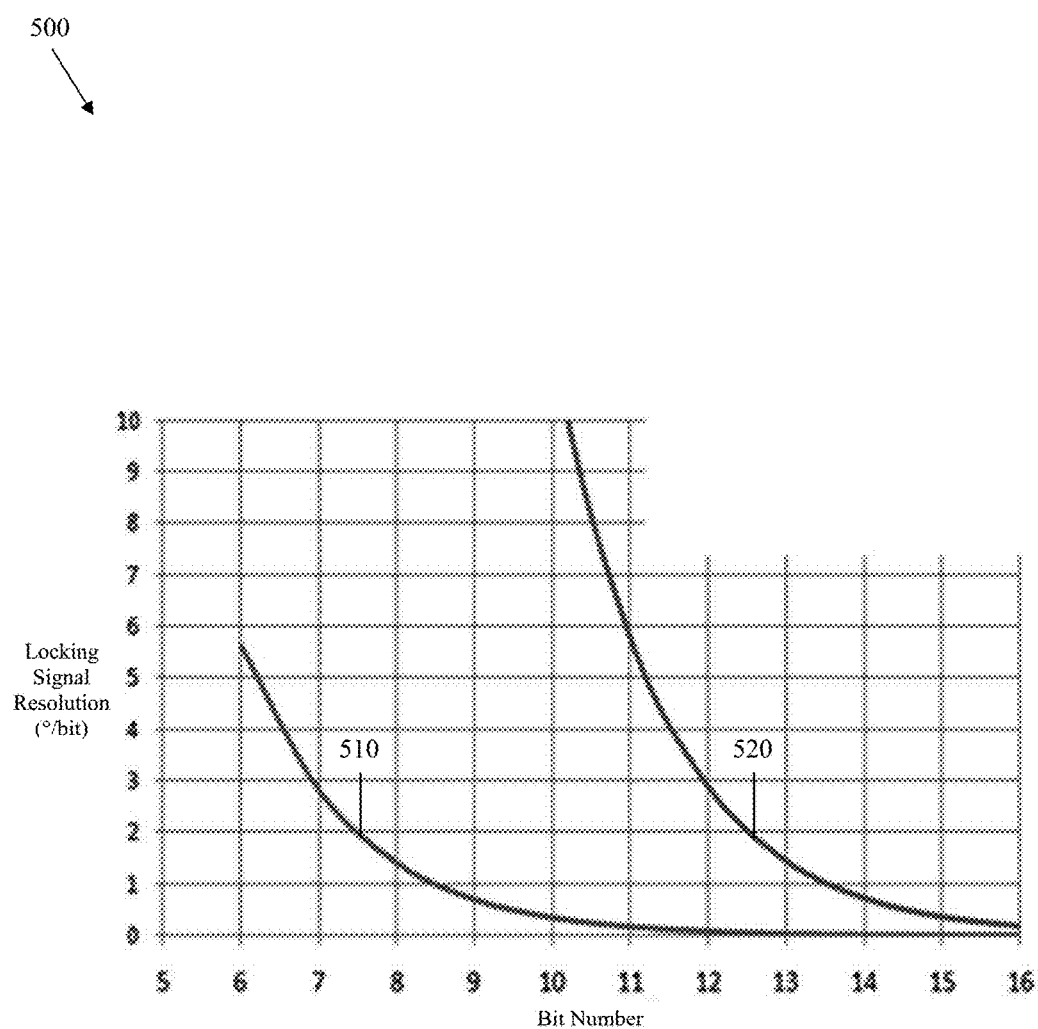
FIG. 5 is a graph of locking signal resolution.

FIG. 5 is a graph 500 of locking signal resolution. The x-axis represents a bit number of an ADC, and the y-axis represents a locking signal resolution of the ADC in degrees per bit. The graph 500 comprises a first curve 510 representing a locking signal resolution for a transceiver such as the transceiver 100 that locks onto a working point of a dither signal's first-order harmonic and comprises a second curve 520 representing a locking signal resolution for a transceiver that that locks onto a maximum value of a dither signal's first-order harmonic.

At a locking signal resolution of about 3°/bit, the bit number is 7 for the first curve 510 and 12 for the second curve 520. Thus, for the first curve 510, about 5 less bits are needed for a given locking signal resolution. In other words, compared to locking onto a maximum value of a first-order harmonic dither signal, locking onto an amplitude ratio of a first-order harmonic dither signal requires less ADC processing and relaxes an ADC resolution.

Figure 6:
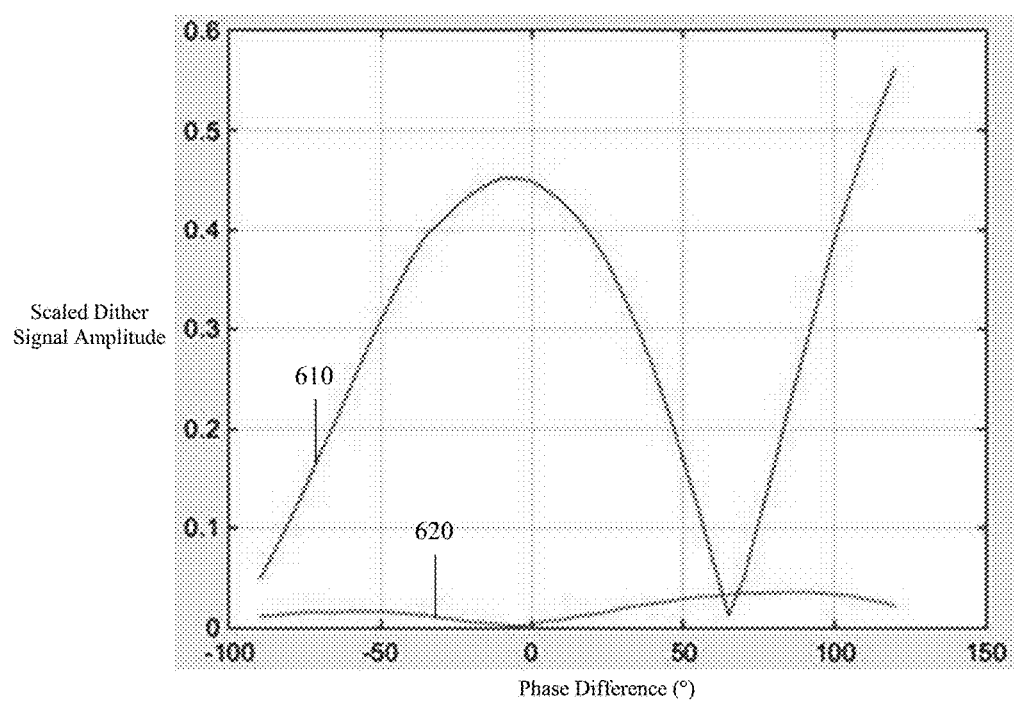
FIG. 6 is a graph of scaled dither signal amplitudes for various types of dither signals.

FIG. 6 is a graph 600 of scaled dither signal amplitudes for various types of dither signals. The x-axis represents an MZM phase difference in degrees, and the y-axis represents a scaled dither signal amplitude. The graph 600 comprises a first curve 610 representing a scaled dither signal amplitude for a first-order harmonic and comprises a second curve 620 representing a scaled dither signal amplitude for a second-order harmonic.

The second curve 620 generally has a much lower scaled dither signal amplitude than the first curve 610. Weaker signals require more complicated detection circuits and provide for decreased locking accuracies. In other words, compared to locking onto a dither signal's second-order harmonic, locking onto a dither signal's first-order harmonic requires less complicated detection circuits and provides for increased locking accuracy.

Figure 7:
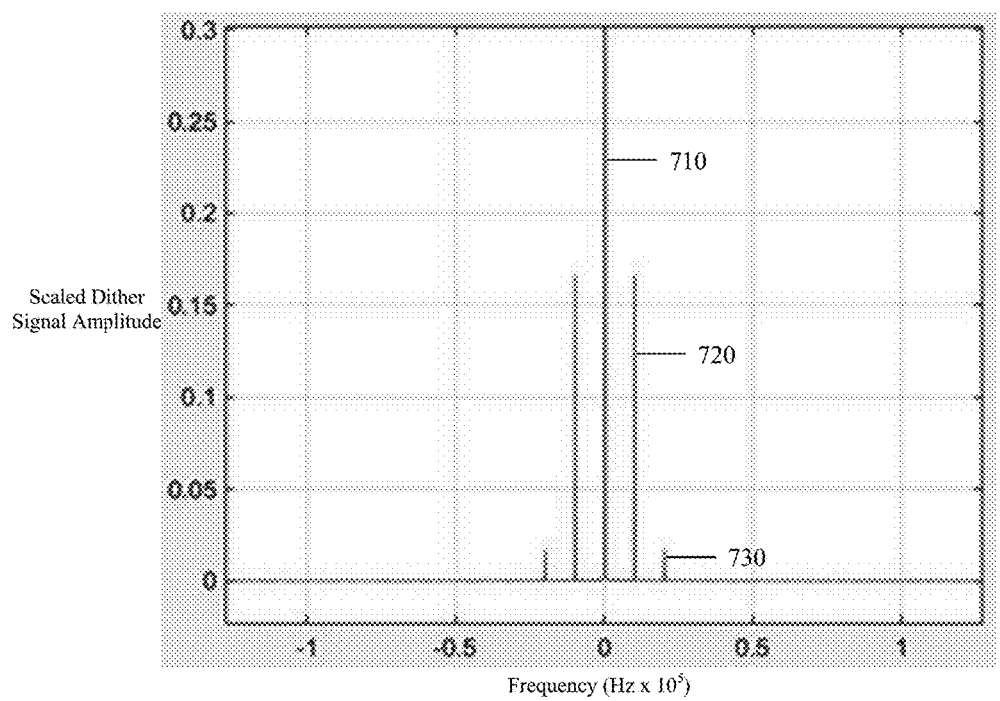
FIG. 7 is a graph of scaled dither signal amplitudes for various types of dither signals.

FIG. 7 is another graph 700 of scaled dither signal amplitudes for various types of dither signals. The x-axis represents frequency in Hz×$10^5$, and the y-axis represents a scaled dither signal amplitude. The graph 700 comprises a first peak 710 representing a DC signal at about 0 kHz, a second peak 720 representing a dither signal's first-order harmonic at about 1 kHz, and a third peak 730 representing a dither signal's second-order harmonic at about 2 kHz.

The first peak 710 shows that a DC signal has the highest scaled signal amplitude and is therefore easiest to detect. However, a transceiver implementing a DC signal to detect a tapped DC signal is relatively more expensive in a multi-channel system. The third peak 730 shows that the dither signal's second-order harmonic has a relatively low scaled dither signal amplitude and is therefore harder to detect. However, a transceiver detecting the dither signal's second-order harmonic is relatively less expensive in a multi-channel system. The second peak 720 shows that the dither signal's first-order harmonic is easier to detect. In addition, a transceiver such as the transceiver 100 detecting the dither signal's first-order harmonic is also relatively less expensive to implement. Thus, the transceiver 100 provides both easier detection and less cost.

Figure 8:
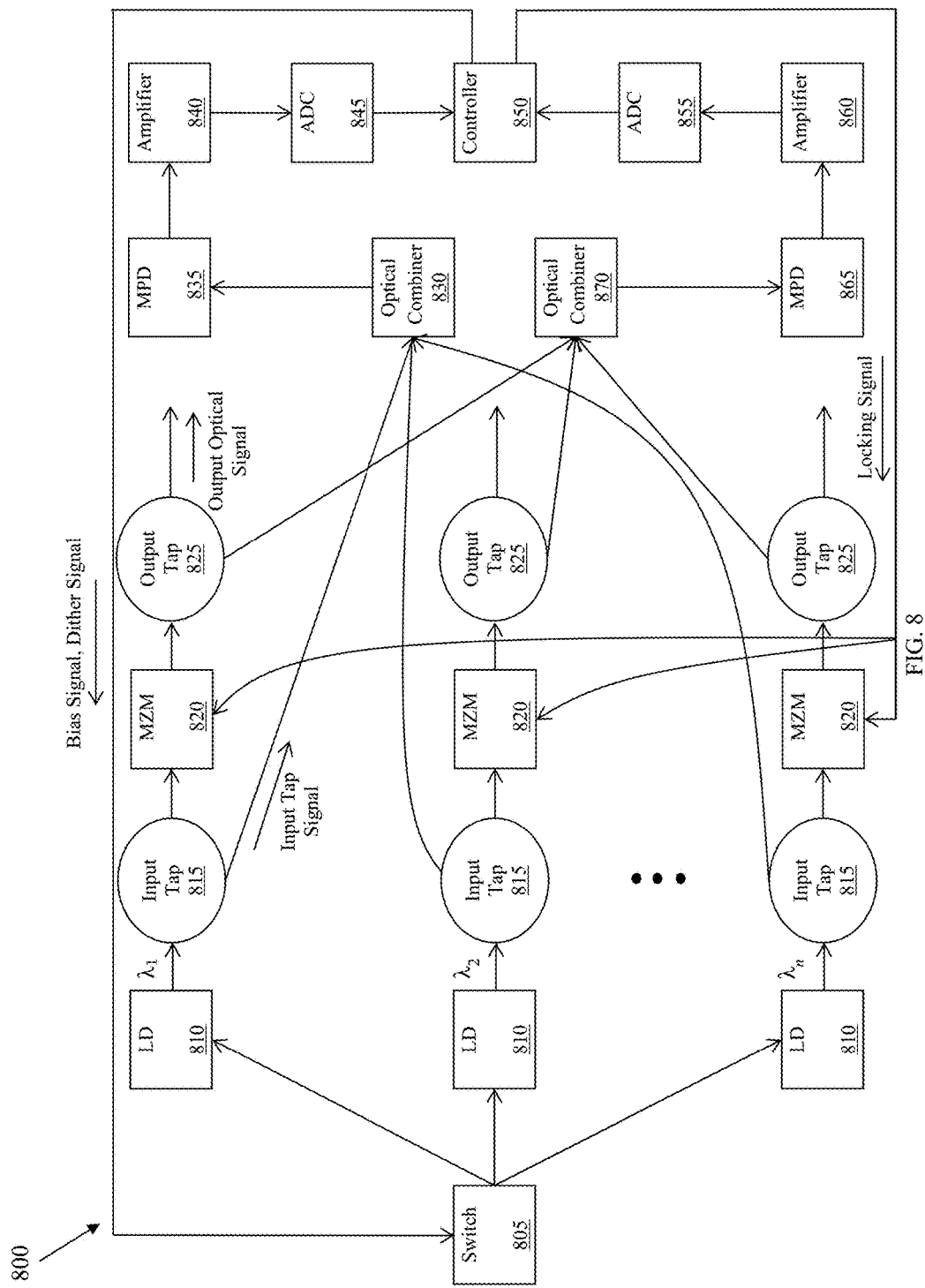
FIG. 8 is a schematic diagram of a multi-channel transceiver according to an embodiment of the disclosure.

FIG. 8 is a schematic diagram of a multi-channel transceiver 800 according to an embodiment of the disclosure. The transceiver 800 comprises a switch 805, n LDs 810, n input taps 815, n MZMs 820, n output taps 825, an optical combiner 830, an MPD 835, an amplifier 840, an ADC 845, a controller 850, an ADC 855, an amplifier 860, an MPD 865, and an optical combiner 870. N is an integer equal to 2 or greater. The transceiver 800 functions in a manner similar to the transceiver 100 in FIG. 1.

However, unlike the transceiver 100, the transceiver 800 comprises the switch 805, which passes an electrical bias signal and an electrical dither signal to the LDs 810 at different time instances. In response, the LDs 810 generate optical bias signals and optical dither signals, combine the optical bias signals and the optical dither signals to generate input optical signals, and provide the input optical signals to the MZMs 820 in a continuous manner. Each of the input optical signals is at a different wavelength denoted as $\lambda_1, \lambda_2, \ldots, \lambda_n$.

The input taps 815 tap off input tap signals from the input optical signals and pass the input tap signals to the optical combiner 830. The optical combiner 830 combines the input tap signals to create a combined input tap signal. The MPD 835 converts the combined input tap signal to analog signals at different time instances corresponding to the different wavelengths.

The output taps 825 tap off output tap signals from output modulator signals from the MZMs 820 and pass the output tap signals to the optical combiner 870. The optical combiner 870 combines the output tap signals to create a combined output tap signal. The MPD 865 converts the combined output tap signal to analog signals at different time instances corresponding to the different wavelengths.

The controller 850 determines working points of the MZMs 820 based on dither signals from digital input tap signals and dither signals from digital output tap signals. The controller 850 continues adjusting locking signals until the MZMs 820 reach their working points. Unlike in the transceiver 100, the controller 850 in the transceiver 800 cannot use DC signals from the input taps 815 and the output taps 825 to lock onto the MZMs 820 because the m DC signals would add to each other and therefore be indistinguishable in contrast to the dither signals in the input tap signals and the output tap signals that are at the different wavelengths and the different time instances.

Figure 9:
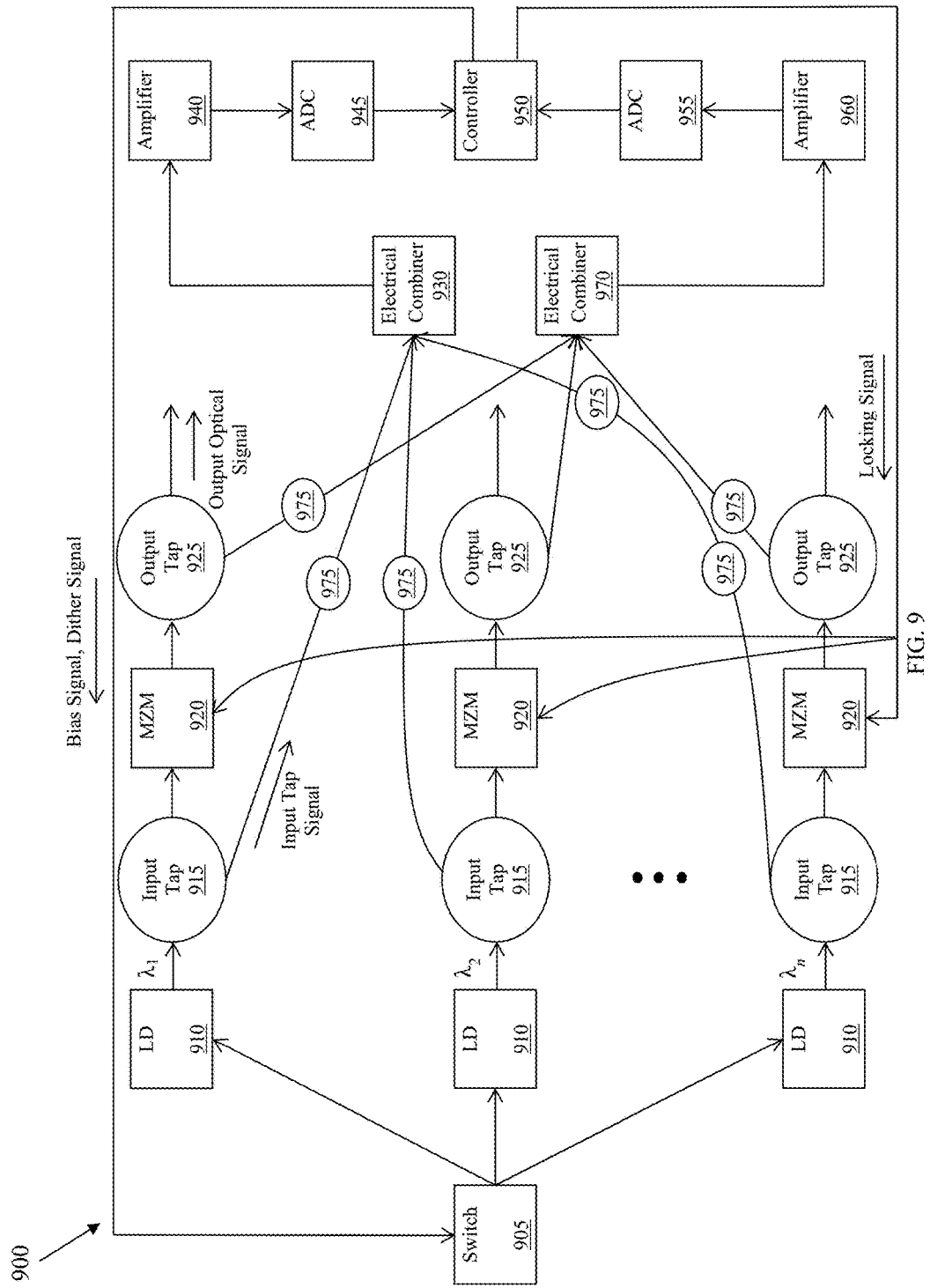
FIG. 9 is a schematic diagram of a multi-channel transceiver according to another embodiment of the disclosure.

FIG. 9 is a schematic diagram of a multi-channel transceiver 900 according to another embodiment of the disclosure. The transceiver 900 comprises a switch 905, n LDs 910, n input taps 915, n MZMs 920, n output taps 925, an electrical combiner 930, an amplifier 940, an ADC 945, a controller 950, an ADC 955, an amplifier 960, an electrical combiner 970, and MPDs 975. The transceiver 900 functions in a manner similar to the transceiver 800 in FIG. 8. However, unlike the optical combiners 830, 870 in the transceiver 800, the electrical combiners 930, 970 in the transceiver 900 are electrical, not optical. This is because the MPDs 975 are placed before the electrical combiners 930, 970. One may choose between the transceiver 800 and the transceiver 900 based on component availability, component cost, circuit design, and other factors.

Figure 10:
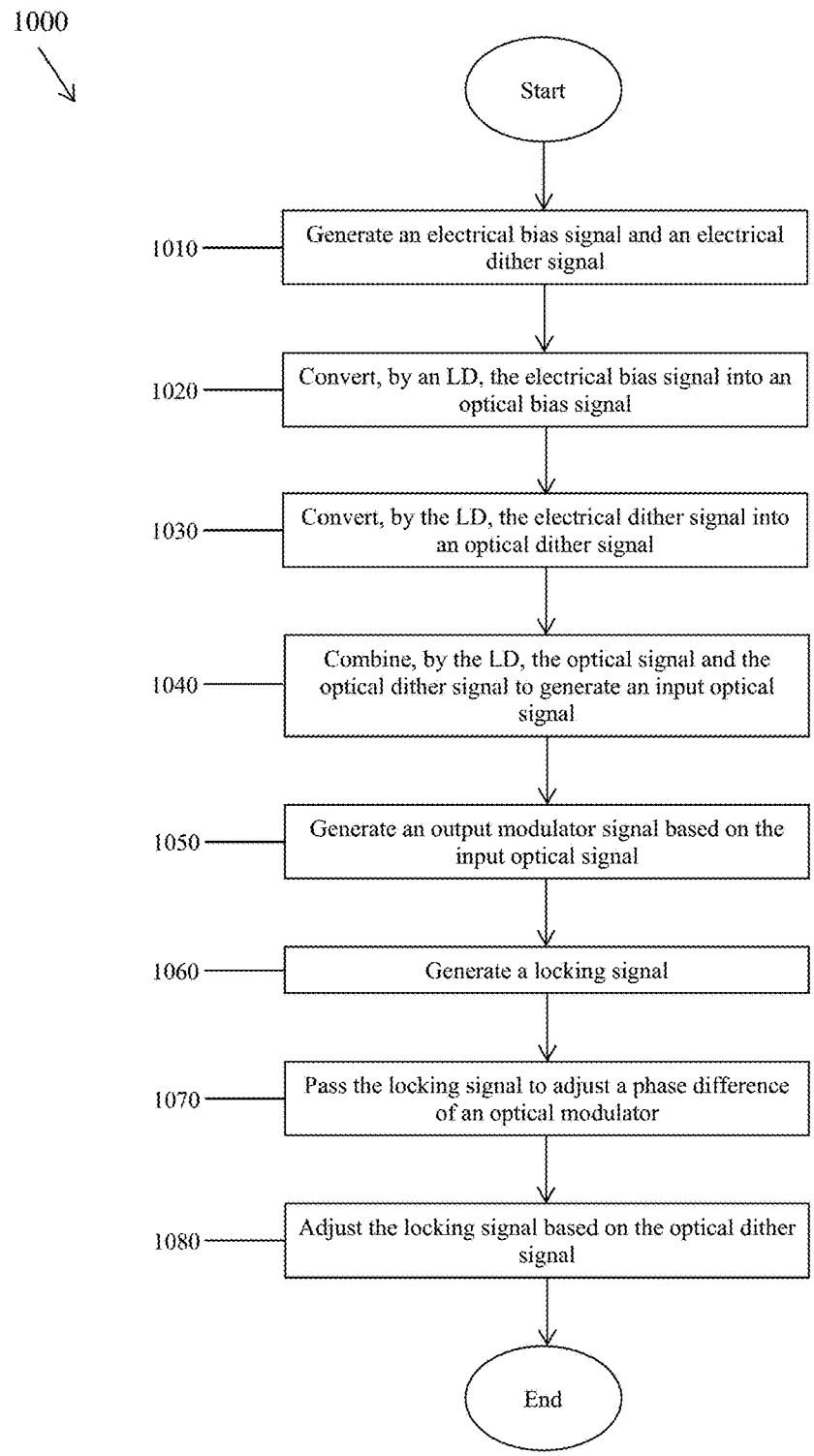
FIG. 10 is a flowchart illustrating a method of optical modulator bias locking according to an embodiment of the disclosure.

FIG. 10 is a flowchart illustrating a method 1000 of optical modulator bias locking according to an embodiment of the disclosure. The transceivers 100, 800, 900 may perform the method 1000. At step 1010, an electrical bias signal and an electrical dither signal are generated. For instance, the controllers 165, 850, 950 generate the electrical bias signal and the electrical dither signal.

At step 1020, the electrical bias signal is converted by an LD into an optical bias signal. For instance, the LDs 105, 810, 910 convert the electrical bias signal into the optical bias signal, which does not include a dither signal. At step 1030, the electrical dither signal is converted by the LD into an optical dither signal. For instance, the LDs 105, 810, 910 convert the electrical dither signal into the optical dither signal. At step 1040, the optical bias signal and the optical dither signal are combined by the LD to generate an input optical signal. For instance, the LDs 105, 810, 910 combine the optical bias signal and the optical dither signal to generate the input optical signal.

At step 1050, an output modulator signal is generated based on the input optical signal. For instance, the MZMs 115, 820, 920 generate the output modulator signal based on the input optical signal. At step 1060, a locking signal is generated. For instance, the controllers 165, 850, 950 generate the locking signal. At step 1070, the locking signal is passed to adjust a phase difference of an optical modulator. For instance, the controllers 165, 850, 950 pass the locking signal to the MZMs 115, 820, 920 to adjust the phase difference of the MZMs 115, 820, 920. Finally, at step 1080, the locking signal is adjusted based on the optical dither signal. For instance, the controllers 165, 850, 950 adjust the locking signal based on the optical dither signal.

In an example embodiment, an apparatus comprises: a controller element configured to generate an electrical bias signal and an electrical dither signal; an LD element configured to: convert the electrical bias signal into an optical bias signal; convert the electrical dither signal into an optical dither signal; and combine the optical bias signal and the optical dither signal to generate an input optical signal; and an optical modulator element configured to generate an output modulator signal based on the input optical signal; wherein the controller is further configured to: generate a locking signal; pass the locking signal to the optical modulator to adjust a phase difference of the optical modulator; and adjust the locking signal based on the optical dither signal.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a laser diode (LD);
   a first input tap coupled to the LD;
   a first optical modulator coupled to the first input tap;
   a first output tap coupled to the first optical modulator so that the first optical modulator is positioned between the first input tap and the first output tap;
   a first monitoring photodiode (MPD) coupled to the first input tap;
   a first amplifier coupled to the first MPD;
   a first analog-to-digital converter (ADC) coupled to the first amplifier; and
   a controller indirectly coupled to the first input tap and the first output tap and coupled to the LD and the first ADC so that the first input tap, the first MPD, the first amplifier, and the first ADC are positioned between the LD and the controller.

2. The apparatus of claim 1, further comprising:
   a second MPD coupled to the first output tap;
   a second amplifier coupled to the second MPD; and
   a second ADC coupled to the second amplifier and the controller so that the second MPD, the second amplifier, and the second ADC are positioned between the first output tap and the controller.

3. The apparatus of claim 2, wherein the first optical modulator is an electrical-to-optical modulator comprising:

a 1×2 coupler coupled to the first input tap;
a first phase section optically coupled to the 1×2 coupler;
a second phase section optically coupled to the 1×2 coupler and electrically coupled to the controller; and
a 2×1 coupler optically coupled to the first phase section, the second phase section, and the first output tap.

4. An apparatus comprising:
a first input tap;
a first optical modulator coupled to the first input tap;
a first output tap coupled to the first optical modulator so that the first optical modulator is positioned between the first input tap and the first output tap;
a controller indirectly coupled to the first input tap and the first output tap;
a switch coupled to the controller;
a first laser diode (LD) coupled to the switch and the first input tap;
a second LD coupled to the switch;
a second input tap coupled to the second LD;
a second optical modulator coupled to the second input tap; and
a second output tap coupled to the second optical modulator so that the second optical modulator is positioned between the second input tap and the second output tap,
the controller is indirectly coupled to the second input tap and the second output tap.

5. The apparatus of claim 4, further comprising:
a first optical combiner coupled to the first input tap and the second input tap;
a first monitoring photodiode (MPD) coupled to the first optical combiner;
a first amplifier coupled to the first MPD; and
a first analog-to-digital converter (ADC) coupled to the first amplifier and the controller so that the first optical combiner, the first MPD, the first amplifier, and the first ADC are positioned between the first input tap and the second input tap on one hand and the controller on another hand.

6. The apparatus of claim 5, further comprising:
a second optical combiner coupled to the first output tap and the second output tap;
a second MPD coupled to the second optical combiner;
a second amplifier coupled to the second MPD; and
a second ADC coupled to the second amplifier and the controller so that the second optical combiner, the second MPD, the second amplifier, and the second ADC are positioned between the first output tap and the second output tap on one hand and the controller on another hand.

7. The apparatus of claim 4, further comprising:
a first monitoring photodiode (MPD) coupled to the first input tap;
a second MPD coupled to the second input tap;
a first electrical combiner coupled to the first MPD and the second MPD;
a first amplifier coupled to the first electrical combiner; and
a first analog-to-digital converter (ADC) coupled to the first amplifier and the controller so that the first electrical combiner, the first amplifier, and the first ADC are positioned between the first input tap and the second input tap on one hand and the controller on another hand.

8. The apparatus of claim 7, further comprising:
a third MPD coupled to the first output tap;
a fourth MPD coupled to the second output tap;
a second electrical combiner coupled to the third MPD and the fourth MPD;
a second amplifier coupled to the second electrical combiner; and
a second ADC coupled to the second amplifier and the controller so that the second electrical combiner, the second amplifier, and the second ADC are positioned between the first output tap and the second output tap on one side and the controller on another side.

9. An apparatus comprising:
a controller configured to generate an electrical bias signal and an electrical dither signal;
a laser diode (LD) configured to:
  receive the electrical bias signal from the controller;
  convert the electrical bias signal into an optical bias signal;
  receive the electrical dither signal from the controller;
  convert the electrical dither signal into an optical dither signal; and
  combine the optical bias signal and the optical dither signal to generate an input optical signal; and
an optical modulator configured to generate an output modulator signal based on the input optical signal;
wherein the controller is further configured to:
  generate a locking signal;
  pass the locking signal to the optical modulator to adjust a phase difference of the optical modulator; and
  adjust the locking signal based on the optical dither signal.

10. The apparatus of claim 9, further comprising:
an input tap coupled to the LD and configured to:
  tap off an input tap signal from the input optical signal; and
  pass an input modulator signal to the optical modulator;
a first monitoring photodiode (MPD) configured to convert the input tap signal to a first analog signal;
a first amplifier configured to amplify the first analog signal to create a first amplified analog signal; and
a first analog-to-digital converter (ADC) configured to convert the first amplified analog signal to a digital input tap signal.

11. The apparatus of claim 10, further comprising:
an output tap configured to:
  tap off an output tap signal from the output modulator signal; and
  pass an output optical signal;
a second MPD configured to convert the output tap signal to a second analog signal;
a second amplifier configured to amplify the second analog signal to create a second amplified analog signal; and
a second ADC configured to convert the second amplified analog signal to a digital output tap signal.

12. The apparatus of claim 11, wherein the controller is further configured to:
receive the digital input tap signal;
filter out a first dither signal from the digital input tap signal;
receive the digital output tap signal;
filter out a second dither signal from the digital output tap signal;
determine a ratio of the second dither signal to the first dither signal; and
further adjust the locking signal based on the ratio.

13. The apparatus of claim 12, wherein the controller is further configured to further adjust the locking signal until the phase difference reaches a working point.

14. A method comprising:
generating, by a controller, an electrical bias signal and an electrical dither signal;
receiving, by a laser diode (LD) and from the controller, the electrical bias signal;
converting, by the LD, the electrical bias signal into an optical bias signal;
receiving, by the LD and from the controller, the electrical dither signal;
converting, by the LD, the electrical dither signal into an optical dither signal;
combining, by the LD, the optical bias signal and the optical dither signal to generate an input optical signal;
generating an output modulator signal based on the input optical signal;
generating a locking signal;
passing the locking signal to adjust a phase difference of an optical modulator; and
adjusting the locking signal based on the optical dither signal.

15. The method of claim 14, further comprising:
tapping off an input tap signal from the input optical signal;
passing an input modulator signal;
converting the input tap signal to a first analog signal;
amplifying the first analog signal to create a first amplified analog signal; and
converting the first amplified analog signal to a digital input tap signal.

16. The method of claim 15, further comprising:
tapping off an output tap signal from the output modulator signal;
passing an output optical signal;
converting the output tap signal to a second analog signal;
amplifying the second analog signal to create a second amplified analog signal; and
converting the second amplified analog signal to a digital output tap signal.

17. The method of claim 16, further comprising:
receiving the digital input tap signal;
filtering out a first dither signal from the digital input tap signal;
receiving the digital output tap signal;
filtering out a second dither signal from the digital output tap signal;
determining a ratio of the second dither signal to the first dither signal; and
further adjusting the locking signal based on the ratio.

18. The method of claim 17, further comprising further adjusting the locking signal until the phase difference reaches a working point.

19. The apparatus of claim 1, wherein the first input tap and the first output tap are optical-to-optical taps comprising tap ratios.

* * * * *